(12) United States Patent
Haruna et al.

(10) Patent No.: US 12,646,087 B2
(45) Date of Patent: Jun. 2, 2026

(54) ELECTRIC POWER SUPPLY-DEMAND ADJUSTMENT SYSTEM AND ELECTRIC POWER SUPPLY-DEMAND ADJUSTMENT METHOD

(71) Applicant: Hitachi, Ltd., Tokyo (JP)

(72) Inventors: Takaaki Haruna, Tokyo (JP); Hiroki Miyamoto, Tokyo (JP)

(73) Assignee: Hitachi, LTD., Tokyo (JP)

( * ) Notice: Subject to any disclaimer, the term of this patent is extended or adjusted under 35 U.S.C. 154(b) by 193 days.

(21) Appl. No.: 18/524,698

(22) Filed: Nov. 30, 2023

(65) Prior Publication Data

US 2024/0202753 A1     Jun. 20, 2024

(30) Foreign Application Priority Data

Dec. 14, 2022     (JP) ................................. 2022-199435

(51) Int. Cl.
*G06Q 30/02*        (2023.01)
*G06Q 30/0202*      (2023.01)
*G06Q 50/06*        (2012.01)

(52) U.S. Cl.
CPC ......... *G06Q 30/0202* (2013.01); *G06Q 50/06* (2013.01)

(58) Field of Classification Search
CPC ............................................... G06Q 10/00–90
See application file for complete search history.

(56) References Cited

U.S. PATENT DOCUMENTS

| | | | |
|---|---|---|---|
| 7,679,336 B2 * | 3/2010 | Gale ....................... | B60L 53/14 320/155 |
| 2013/0015713 A1 * | 1/2013 | Hagihara .................. | H02J 3/32 307/72 |
| 2017/0093155 A1 | 3/2017 | Hannah et al. | |
| 2022/0348106 A1 * | 11/2022 | Sujan ..................... | B60L 53/63 |

* cited by examiner

*Primary Examiner* — Arif Ullah
(74) *Attorney, Agent, or Firm* — Volpe Koenig

(57)                 ABSTRACT

In an electric power supply-demand adjustment system for performing electric power supply-demand adjustment by causing, by using a computer including a processor and memory, customers to control power consumption in accordance with an instruction issued by an aggregator, the processor, on the basis of demand response (DR) event information stored in the memory and including a scheduled event regarding the electric power supply-demand adjustment, and customer profile information stored in the memory and indicating a feature of a time-shiftable process performed by the customers consuming electric power, obtains a combination of processes shifted within an acceptable range, in which combination a power reduction amount fulfills a requested adjustment amount, to generate, for each of the customers, DR request information including a request for supply-demand adjustment of a power adjustment amount determined by the scheduled DR event, and determines a width of the shift to carry out electric power supply-demand adjustment.

8 Claims, 10 Drawing Sheets

F I G . 5
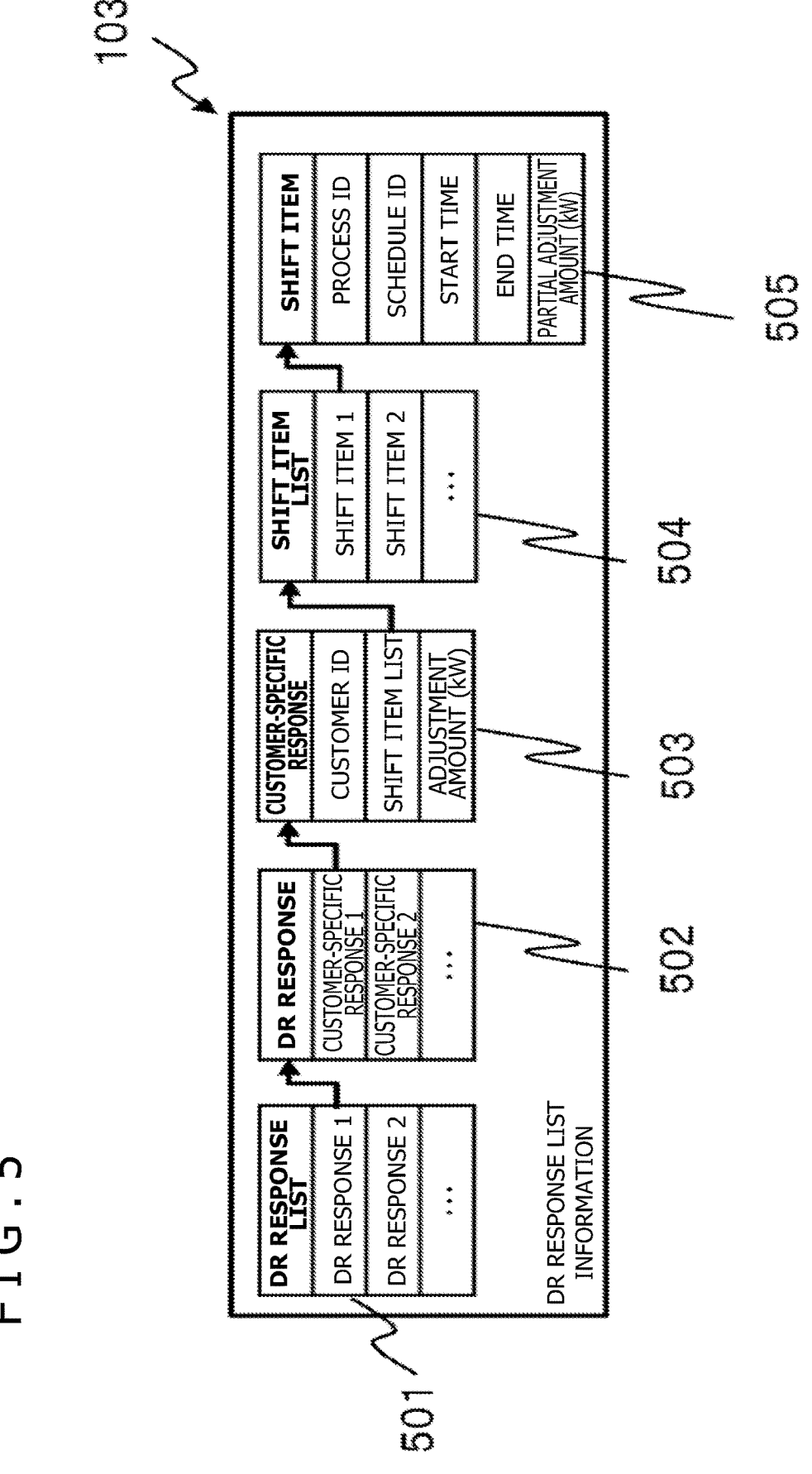

104

601

602

105

EXAMPLE OF CUSTOMER EVALUATION POLICY INFORMATION

CUSTOMER PRIORITY =

(CUMULATIVE ACTUAL ADJUSTMENT TIME / CUMULATIVE SCHEDULED ADJUSTMENT TIME) * TIME COEFFICIENT + (ACTUAL ADJUSTMENT kW VALUE / SCHEDULED ADJUSTMENT kW VALUE) * POWER COEFFICIENT

F I G . 8

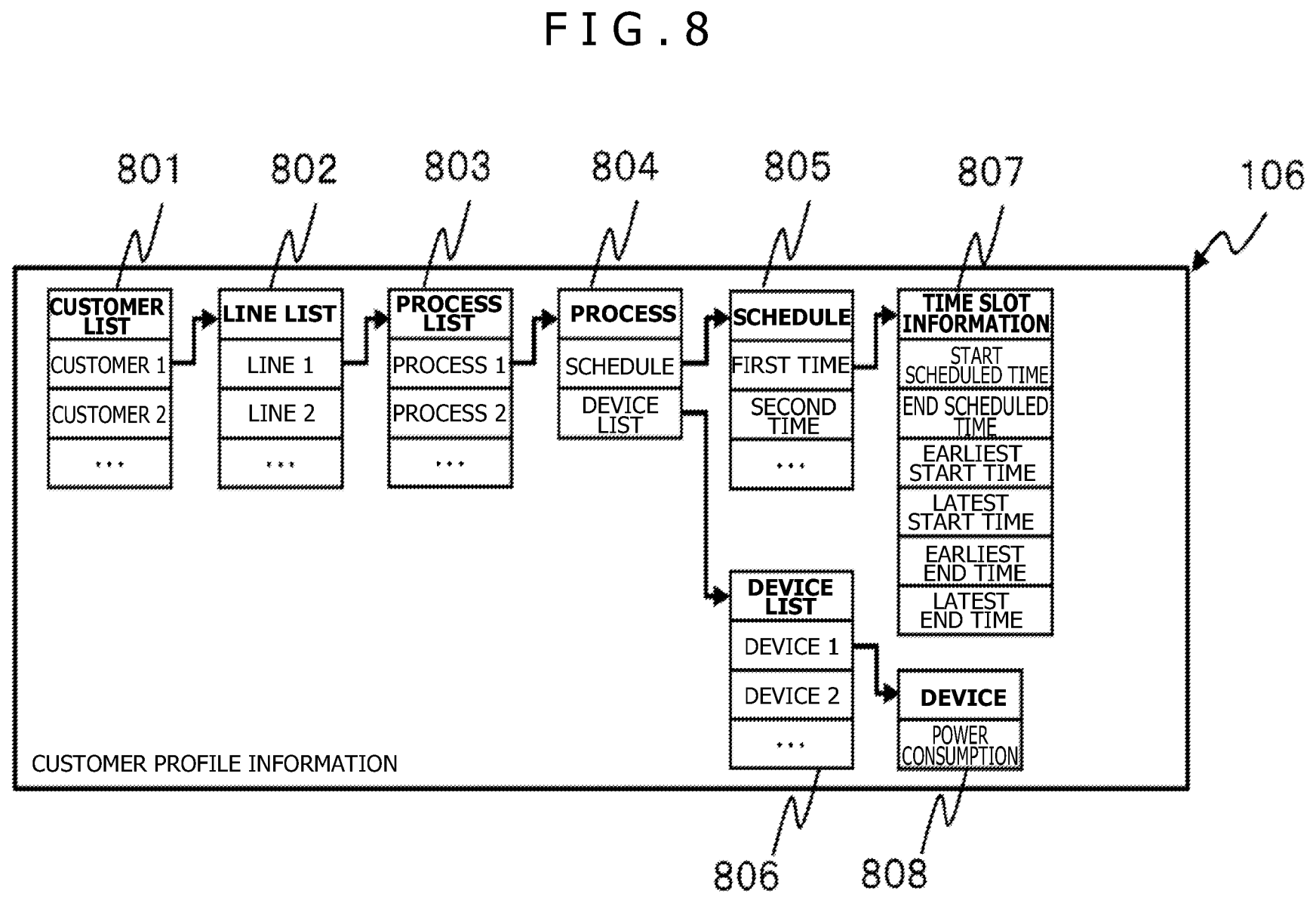

106

801 CUSTOMER LIST
- CUSTOMER 1
- CUSTOMER 2
- ...

802 LINE LIST
- LINE 1
- LINE 2
- ...

803 PROCESS LIST
- PROCESS 1
- PROCESS 2
- ...

804 PROCESS
- SCHEDULE
- DEVICE LIST

805 SCHEDULE
- FIRST TIME
- SECOND TIME
- ...

807 TIME SLOT INFORMATION
- START SCHEDULED TIME
- END SCHEDULED TIME
- EARLIEST START TIME
- LATEST START TIME
- EARLIEST END TIME
- LATEST END TIME

806 DEVICE LIST
- DEVICE 1
- DEVICE 2
- ...

808 DEVICE
- POWER CONSUMPTION

CUSTOMER PROFILE INFORMATION

F I G . 9

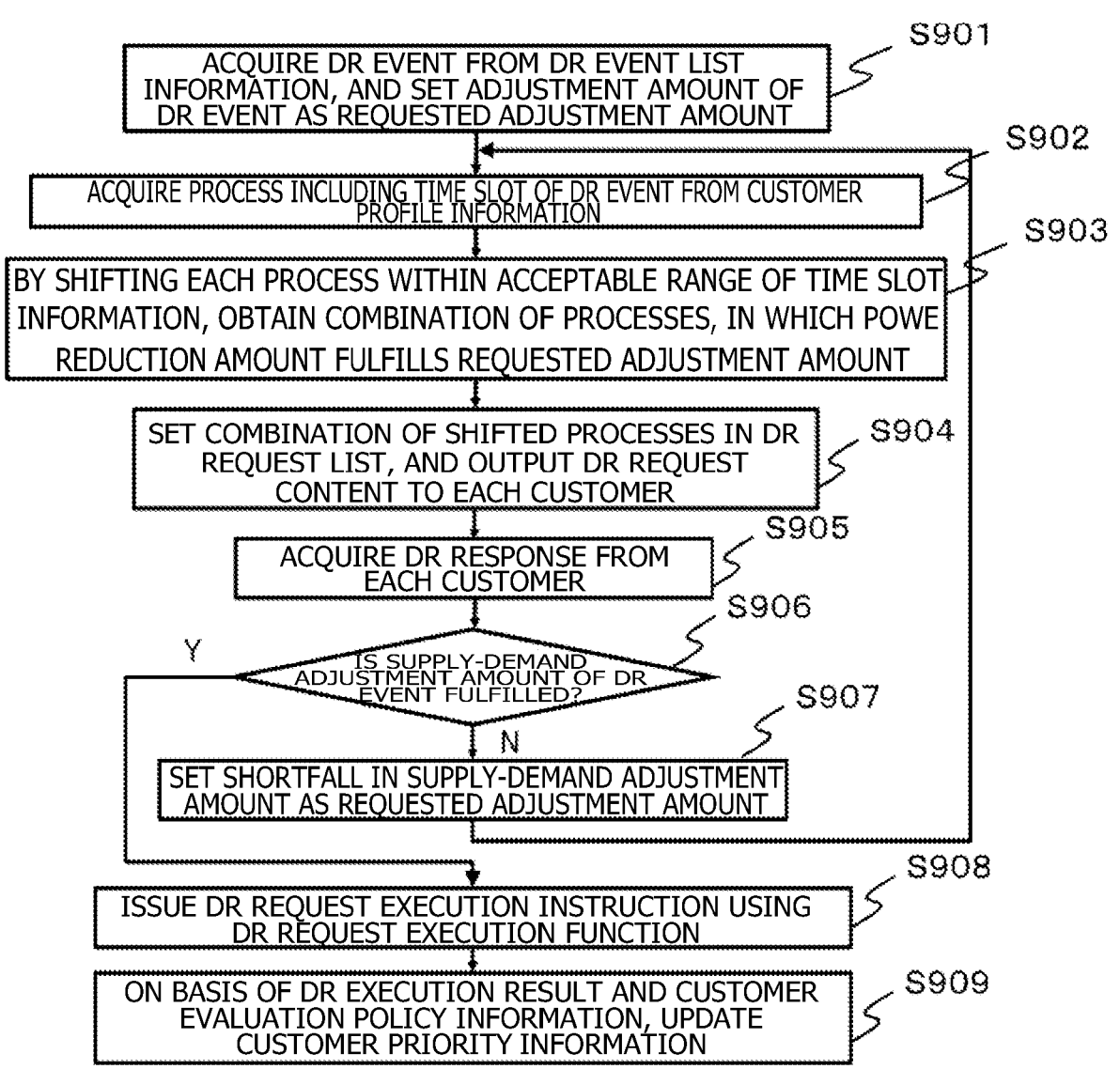

ACQUIRE DR EVENT FROM DR EVENT LIST
INFORMATION, AND SET ADJUSTMENT AMOUNT OF
DR EVENT AS REQUESTED ADJUSTMENT AMOUNT
S901

ACQUIRE PROCESS INCLUDING TIME SLOT OF DR EVENT FROM CUSTOMER
PROFILE INFORMATION
S902

BY SHIFTING EACH PROCESS WITHIN ACCEPTABLE RANGE OF TIME SLOT
INFORMATION, OBTAIN COMBINATION OF PROCESSES, IN WHICH POWE
REDUCTION AMOUNT FULFILLS REQUESTED ADJUSTMENT AMOUNT
S903

SET COMBINATION OF SHIFTED PROCESSES IN DR
REQUEST LIST, AND OUTPUT DR REQUEST
CONTENT TO EACH CUSTOMER
S904

ACQUIRE DR RESPONSE FROM
EACH CUSTOMER
S905

Y
IS SUPPLY-DEMAND
ADJUSTMENT AMOUNT OF DR
EVENT FULFILLED?
S906

N

SET SHORTFALL IN SUPPLY-DEMAND ADJUSTMENT
AMOUNT AS REQUESTED ADJUSTMENT AMOUNT
S907

ISSUE DR REQUEST EXECUTION INSTRUCTION USING
DR REQUEST EXECUTION FUNCTION
S908

ON BASIS OF DR EXECUTION RESULT AND CUSTOMER
EVALUATION POLICY INFORMATION, UPDATE
CUSTOMER PRIORITY INFORMATION
S909

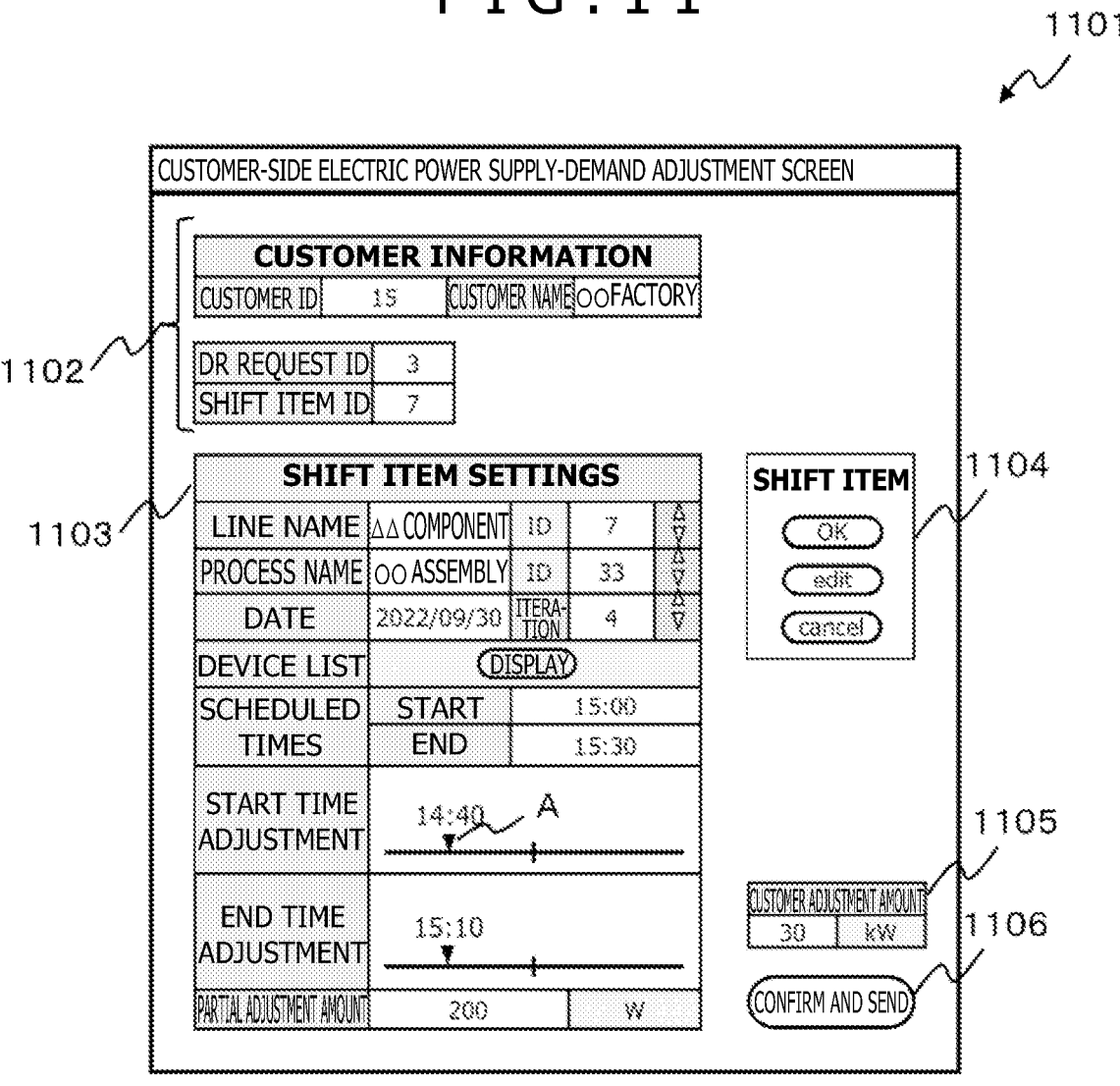

CUSTOMER-SIDE ELECTRIC POWER SUPPLY-DEMAND ADJUSTMENT SCREEN

CUSTOMER INFORMATION

| CUSTOMER ID | 15 | CUSTOMER NAME | ○○FACTORY |
| --- | --- | --- | --- |

| DR REQUEST ID | 3 |
| --- | --- |
| SHIFT ITEM ID | 7 |

1102

SHIFT ITEM SETTINGS

| LINE NAME | △△COMPONENT | ID | 7 |
| --- | --- | --- | --- |
| PROCESS NAME | ○○ASSEMBLY | ID | 33 |
| DATE | 2022/09/30 | ITERA-TION | 4 |
| DEVICE LIST | DISPLAY | | |
| SCHEDULED TIMES | START | 15:00 | |
| | END | 15:30 | |
| START TIME ADJUSTMENT | 14:40  A | | |
| END TIME ADJUSTMENT | 15:10 | | |
| PARTIAL ADJUSTMENT AMOUNT | 200 | W | |

1103

SHIFT ITEM

OK edit cancel

1104

CUSTOMER ADJUSTMENT AMOUNT

| 30 | kW |

1105

1106

CONFIRM AND SEND

ELECTRIC POWER SUPPLY-DEMAND ADJUSTMENT SYSTEM AND ELECTRIC POWER SUPPLY-DEMAND ADJUSTMENT METHOD

BACKGROUND OF THE INVENTION

1. Field of the Invention

The present invention relates to an electric power supply-demand adjustment system and an electric power supply-demand adjustment method.

2. Description of the Related Art

Heretofore, electric power flexibilities generated by numerous customers including small and medium-sized factories have been aggregated for electric power supply-demand adjustment. For example, on the basis of power consumption information obtained by the hour from the customers, the amount of power consumption reduction requested for a time slot targeted for demand response (DR) is determined, and the flexibilities acquired through the consumption reduction are aggregated and supplied to DR providers. Specifically, there is a scheme in which, in response to a supply-demand adjustment request received from a contractor such as the power company and to be used for time slot management and power adjustment, an aggregator in charge of aggregating and managing the flexibilities collects negawatts from multiple customers and supplies what is collected to the contractor to accept compensation therefor. DR involves getting an owner of customer-side energy resources or a third party to control the resources so as to change a power supply-demand pattern. One technology for attaining such ends is disclosed in U.S. Patent Publication No. 2017-093155. The disclosed technology involves defining beforehand the information for selecting the customers targeted for aggregation and dynamically aggregating the customers participating in a DR event generated on the basis of the content of such definitions.

SUMMARY OF THE INVENTION

Negawatt generation is implemented by the start and stop of equipment in the target time slot, by change in operation hours, by shifting of operation time slots, and by control of the operating status of energy plants and power storage equipment. Negawatt is an apparent power-generating capacity obtained by reducing the consumption of power by customers. Negawatt trading is a type of trading that gives incentives in response to the supply of the apparent power-generating capacity. With existing methods, however, there have been cases where it is sometimes difficult to collect the power adjustment amounts requested by the DR provider.

Specifically, the factories of some customers have been unable to reduce the consumption of electric power during the entire DR target time slot (e.g., several hours at a time). Many of these cases are caused typically by discontinuous processes requiring human intervention (assembling, paint application, etc.), product delivery issues, and inventory problems leading to a failure to fulfill the supply-demand adjustment request at the requested time and date. The existing technologies have yet to establish methods for addressing the cases where such customers described above have been generated. That is, whereas the technology disclosed in the above-cited U.S. Patent Publication No. 2017-093155 defines the information for selecting the customers targeted for aggregation, the DR event is supposed to be applied to the defined customers at the same time. Consequently, those customers capable of addressing only a part of the requested time slot cannot be aggregated as flexibility-ready resources. This type of situation can occur more frequently the larger the number of customers taking part in the aggregation, which can exceed an acceptable range of electric power supply-demand adjustment. This problem may be experienced not only in negawatt trading but also in posiwatt trading as well.

It is therefore an object of the present invention to provide a technology capable of providing electric power supply-demand adjustment with more precision than before.

In carrying out the present invention, there is provided an electric power supply-demand adjustment system for performing electric power supply-demand adjustment by causing, by using a computer including a processor and a memory, a plurality of customers to control power consumption in accordance with an instruction issued by an aggregator. In the electric power supply-demand adjustment system, the processor: on the basis of demand response event information that is stored in the memory and includes a scheduled event regarding the electric power supply-demand adjustment, and customer profile information that is stored in the memory and indicates a feature of a time-shiftable process performed by the customers consuming electric power, obtains a combination of processes that are shifted within an acceptable range, in which combination a power reduction amount fulfills a requested adjustment amount, to generate, for each of the customers, demand response request information including a request for supply-demand adjustment of a power adjustment amount determined by the scheduled demand response event; and on the basis of demand response response information including a response to the time-shiftable process, the response being obtained from each of the customers given the generated demand response request information, determines a width of the shift to carry out the electric power supply-demand adjustment.

The present invention thus permits electric power supply-demand adjustment with more precision than before. The foregoing and other objects, and structures and advantages of the present invention will become evident from a reading of the following detailed description of a preferred embodiment.

BRIEF DESCRIPTION OF THE DRAWINGS

FIG. 5 is a schematic diagram listing exemplary DR response list information;

FIG. 8 is a schematic diagram listing exemplary customer profile information;

FIG. 9 is a flowchart depicting the steps of a process (electric power supply-demand adjustment process) performed by this system;

FIG. 11 is a schematic diagram depicting an exemplary electric power supply-demand adjustment screen (customer side) output by a customer's computer.

DESCRIPTION OF THE PREFERRED EMBODIMENT

Figure 1:
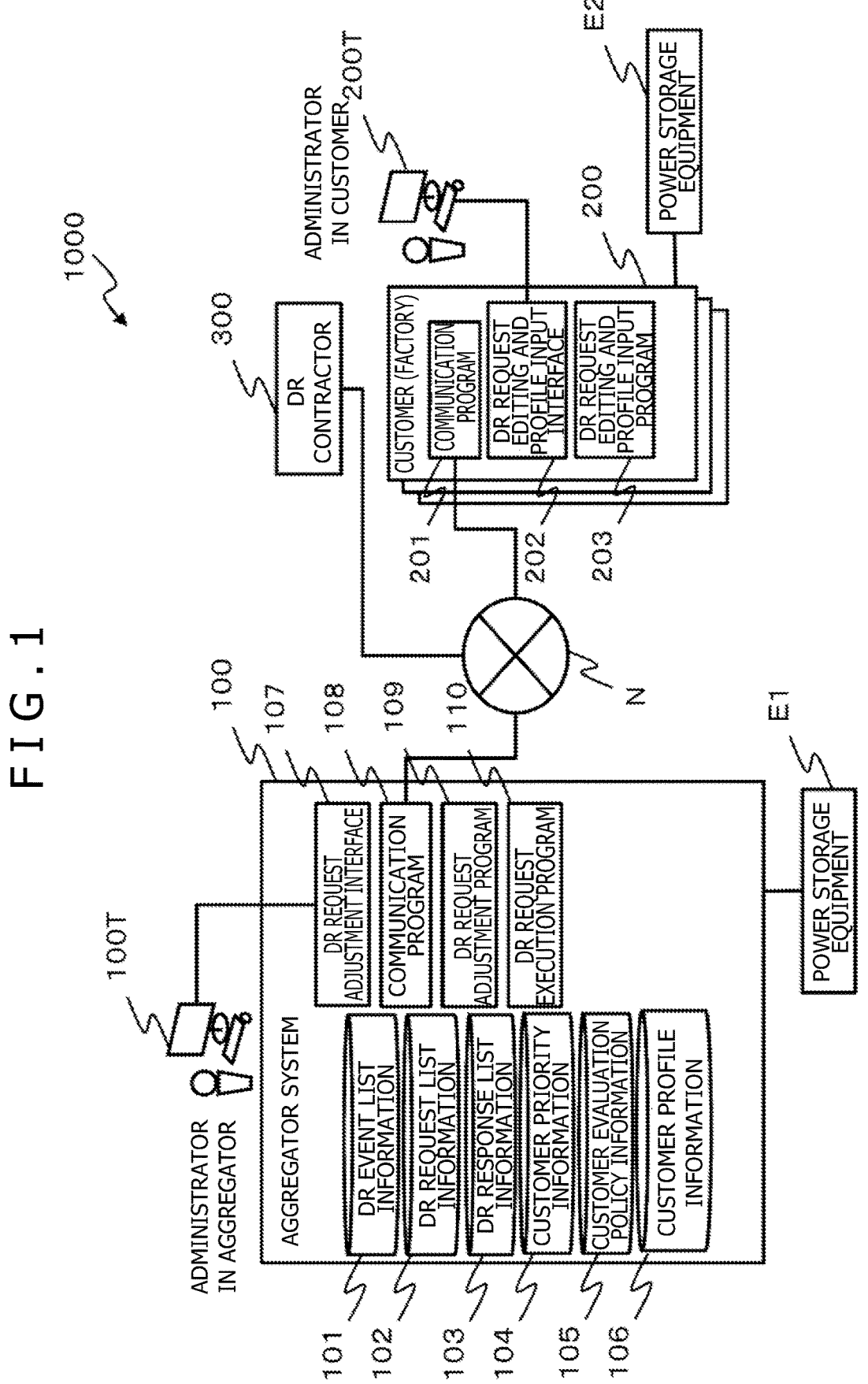
FIG. 1 is a schematic diagram depicting an exemplary configuration of an electric power supply-demand adjustment system as one embodiment of the present invention.

One preferred embodiment of the present invention is described below with reference to the accompanying drawings. The ensuing description and the drawings are examples intended to explain the present invention and are thus abbreviated and simplified as needed for clarification. This invention may also be embodied in various other forms. The components of the embodiment may each be formed by a single or multiple elements unless otherwise specified.

The positions, sizes, shapes, and ranges of the components indicated in the drawings may not represent their actual positions, sizes, shapes, and ranges for the purpose of facilitating the understanding of the present invention. It is thus to be noted that the positions, sizes, shapes, and ranges disclosed in the drawings are not necessarily limitative of this invention.

In the description that follows, diverse information may be explained using expressions such as "database," "table," and "list." However, such information may alternatively be expressed using other data structures. The expressions such as "XX table" or "YY list" may be referred to as "XX information" in order to indicate that the information is not dependent on data structures. In the case where identification information is explained using expressions such as "identification information," "identifier," "name," "ID," or "number," these expressions are interchangeable.

In the case where there are multiple components having the same or similar functions, these components may be explained using the same reference signs with different suffixes. However, if there is no need to distinguish these components from each other, they may be explained without recourse to such suffixes.

In the description that follows, there are cases of explaining processes performed by executing programs. The programs are executed by a processor (e.g., central processing unit (CPU)) or graphics processing unit (GPU)) in such a manner that predetermined processes are carried out using storage resources (e.g., memory) and/or an interface (I/F) device (e.g., communication port) as needed. In that sense, the agent of the processing may be considered the processor. Likewise, the agent of the processing performed by program execution may be a controller, an apparatus, a system, a computer, or a node having the processor. The agent of the processing performed by executing the program may be an arithmetic part that may include a dedicated circuit for carrying out specific processes (e.g., field-programmable gate array (FPG) or application specific integrated circuit (ASIC)).

The programs may be installed into an apparatus such as a computer from program sources. The program source, for example, may be a program distribution server or computer-readable storage media. In the case where the program source is the program distribution server, the program distribution server may include a processor and storage resources for storing the programs targeted for distribution.

The processor of the program distribution server may distribute the distribution target programs to other computers. In the ensuing description, two or more programs may be considered implemented as one program, and one program may be considered implemented as two or more programs.

What follows is a description of an electric power supply-demand adjustment system and an electric power supply-demand adjustment method embodying the present invention.

FIG. 1 is a schematic diagram depicting an exemplary configuration of an electric power supply-demand adjustment system as one embodiment of the present invention. As depicted in FIG. 1, an electric power supply-demand adjustment system 1000 is owned by an aggregator in charge of aggregating and managing electric power flexibilities. In the electric power supply-demand adjustment system 1000, an aggregator system 100 and electric power customers 200 are connected with one another via a network N. Using a new demand response (DR) event received from a DR contractor 300 typically made up of the power company and customer profiles received from the customer 200, the aggregator system 100 generates a DR request requesting the customer 200 to fulfill the DR event. On the basis of the amount of power supply-demand adjustment obtained from a DR response to the DR request, the aggregator system 100 performs electric power supply-demand readjustment. The customer 200 gives the DR response to the DR request received from the aggregator system 100. The network N is a common wired or wireless communication link. The aggregator system 100 is connected with an aggregator management terminal 100T operated by an administrator managing this system. The customers 200 are each connected with a customer management terminal 200T operated by an administrator managing the customer.

The aggregator system 100, to be discussed later more specifically, receives a message requesting a new DR event from the DR contractor 300, and registers the DR event accordingly in a DR event list. A DR request adjustment program 109 obtains the amount of power that can be reduced by each customer 200 in a part or the entirety of the time slot targeted for the DR event, on the basis of customer profile information 106 that includes information regarding the processes on the production lines of the factory constituting each customer 200, devices for use in the processes, the power consumed by the devices, and the times for which the processes are scheduled as well as a maximum time range that can be shifted for the processes. Further, the DR request adjustment program 109 aggregates the obtained amounts of power that can be reduced by the requested customers so as to generate a DR request list listing a DR request for each customer to fulfill the amount of supply-demand adjustment requested by the DR event. The DR request adjustment program 109 outputs the generated DR request list to each customer, receives a DR response from each customer responding to the DR request, and registers the received DR responses in a DR response list.

In a case where the sum of addressable supply-demand adjustment amounts included in the DR responses received from the customers 200 fails to fulfill the total requested value of the DR event, the DR request adjustment program 109 again generates a DR request list by adjusting the DR requests on the basis of readjustment priorities defined in customer priority information 104 and the content of the customer profile information 106. The DR request adjustment program 109 outputs the DR request list thus generated to each customer. The aggregator system 100 carries out the above-outlined adjustment repeatedly.

A DR request execution program 110 aggregates the amounts of supply-demand adjustment obtained by issuing a DR request execution instruction to each customer, on the basis of the content of the DR request list finalized to fulfill the total requested value of the DR event. The DR request execution program 110 outputs the aggregated supply-demand adjustment amounts as an electric power supply-demand adjustment amount to the DR contractor 300. Further, following DR execution by the DR contractor 300, the DR request execution program 110 updates the customer priority information 104 on the basis of customer evaluation policy information 105 reflecting the degree at which each customer has achieved the request. Whereas it is assumed for this embodiment that the customers 200 are made up of factories, the customers 200 may also include individuals and diverse business operators such as companies and organizations that use the electric power supplied thereto. The number of the customers 200 may be varied as needed.

The ensuing paragraphs present examples in which the aggregator system 100, the customers 200, and the DR contractor 300 are each constituted by a single computer. Part or all of the functions of the computer or their equivalents may be implemented by a single computer or by multiple computers communicating with each other over a network on a distributed basis. Specific explanations of the data and processes used by this system will be given later.

Figure 2:
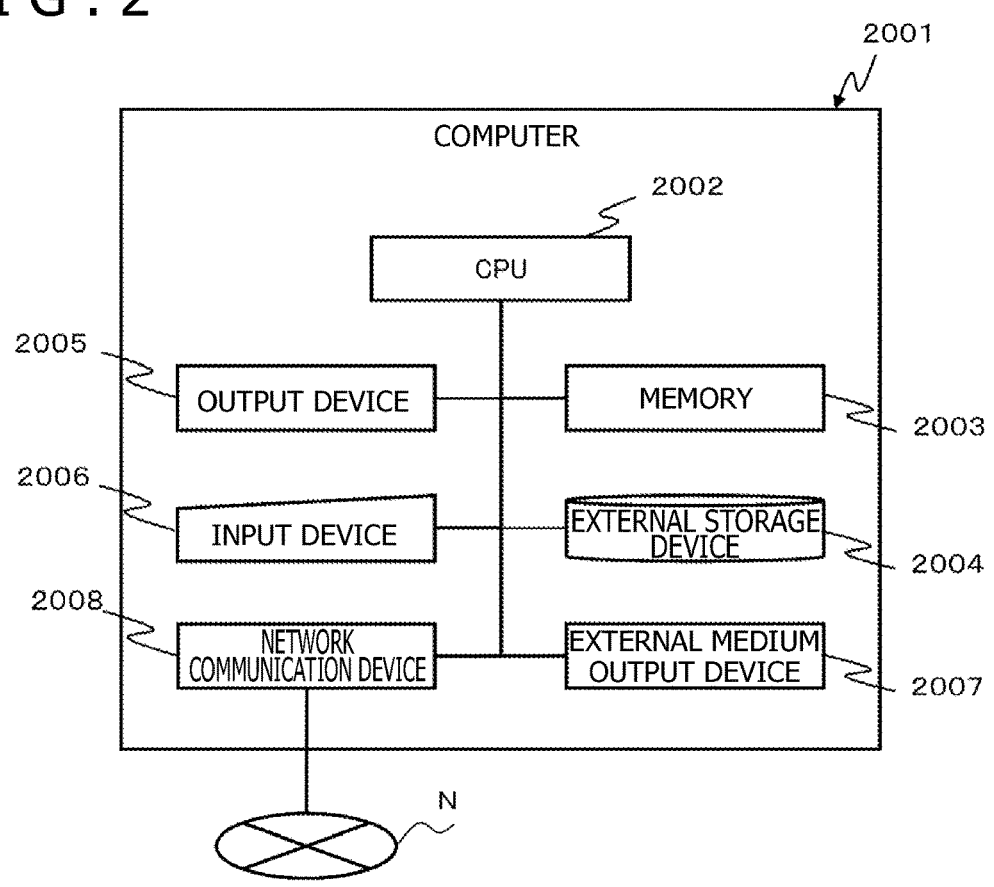
FIG. 2 is a schematic block diagram of a computer.

The aggregator system 100, the customers 200, and the DR contractor 300 may each be implemented using a common server or a general-purpose computer 2001 that includes, as depicted in FIG. 2 (computer schematic diagram), a CPU 2002, a memory 2003, an external storage device 2004 such as a hard disk drive (HDD), an external medium output device 2007 for reading and writing information to and from portable storage media such as a compact disk (CD) or a universal serial bus (USB) memory, an input device 2006 such as a keyboard and a mouse, an output device 2005 such as a display, and a network communication device 2008 such as a network interface card (NIC) for connecting to a communication network. The aggregator management terminal 100T and the customer management terminal 200T may be implemented similarly using the above-outlined computer.

Diverse types of data to be stored in, or processed by, this system may be thus handled by the CPU 2002 reading the data from the memory 2003 or from the external storage device 2004 for use. Various function parts possessed by the aggregator system 100 (e.g., communication program 108, DR request adjustment program 109, and DR request execution program 110, to be discussed later) may be implemented by the CPU 2002 loading relevant programs from the external storage device 2004 into the memory 2003 for program execution.

The above-mentioned relevant programs may be stored (downloaded) from storage media via the external medium output device 2007 or from the network via the network communication device 2008 into the external storage device 2004, before being loaded from there into the memory 2003, and executed by the CPU 2002. Alternatively, the programs may be directly loaded into the memory 2003 from the storage media via the external medium output device 2007 or from the network via the network communication device 2008, before being executed by the CPU 2002.

As depicted in FIG. 1, the aggregator system 100 includes DR event list information 101, DR request list information 102, DR response list information 103, customer priority information 104, customer evaluation policy information 105, customer profile information 106, a DR request adjustment I/F 107, the communication program 108, the DR request adjustment program 109, and a DR request execution program 110. The DR event list information 101 is explained first.

The DR event list information 101 indicates the events related to the electric power supply-demand adjustment and scheduled by the DR contractor 300. The DR event list information 101 is defined in advance by the DR contractor 300.

Figure 3:
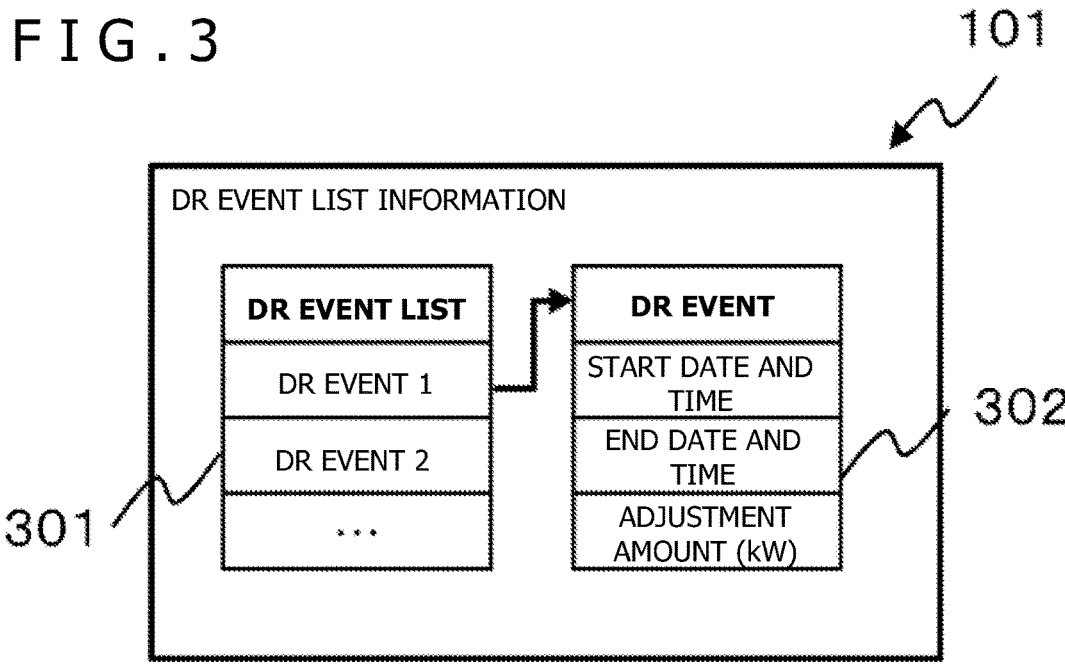
FIG. 3 is a schematic diagram listing exemplary DR event list information.

FIG. 3 is a schematic diagram listing exemplary DR event list information 101. As depicted in FIG. 3, the DR event list information 101 is stored with a DR event list 301 and DR events 302 associated with each other, the DR event list 301 indicating in list form the DR events determined by the DR contractor 300, the DR events 302 each representing specific content of each DR event included in the DR event list 301.

In the DR event list information 101, for example, a "supply-demand adjustment event in the December period, 2022" is stored as "DR event 1" in the DR event list 301. A DR event 302 is stored with "00:00:000 on Dec. 1, 2022" as a "start date and time" and "00:00:000 on Dec. 7, 2022" as an "end date and time." For this one-week period, the events of adjusting "2000 kW" power as an "adjustment amount" are stored in the DR event list information 101. The DR request list information 102 is explained next.

The DR request list information 102 indicates the requests for electric power supply-demand adjustment of the adjustment amounts defined by the DR events scheduled in the DR event information. The DR request list information 102 is generated by the DR request adjustment program 109.

Figure 4:
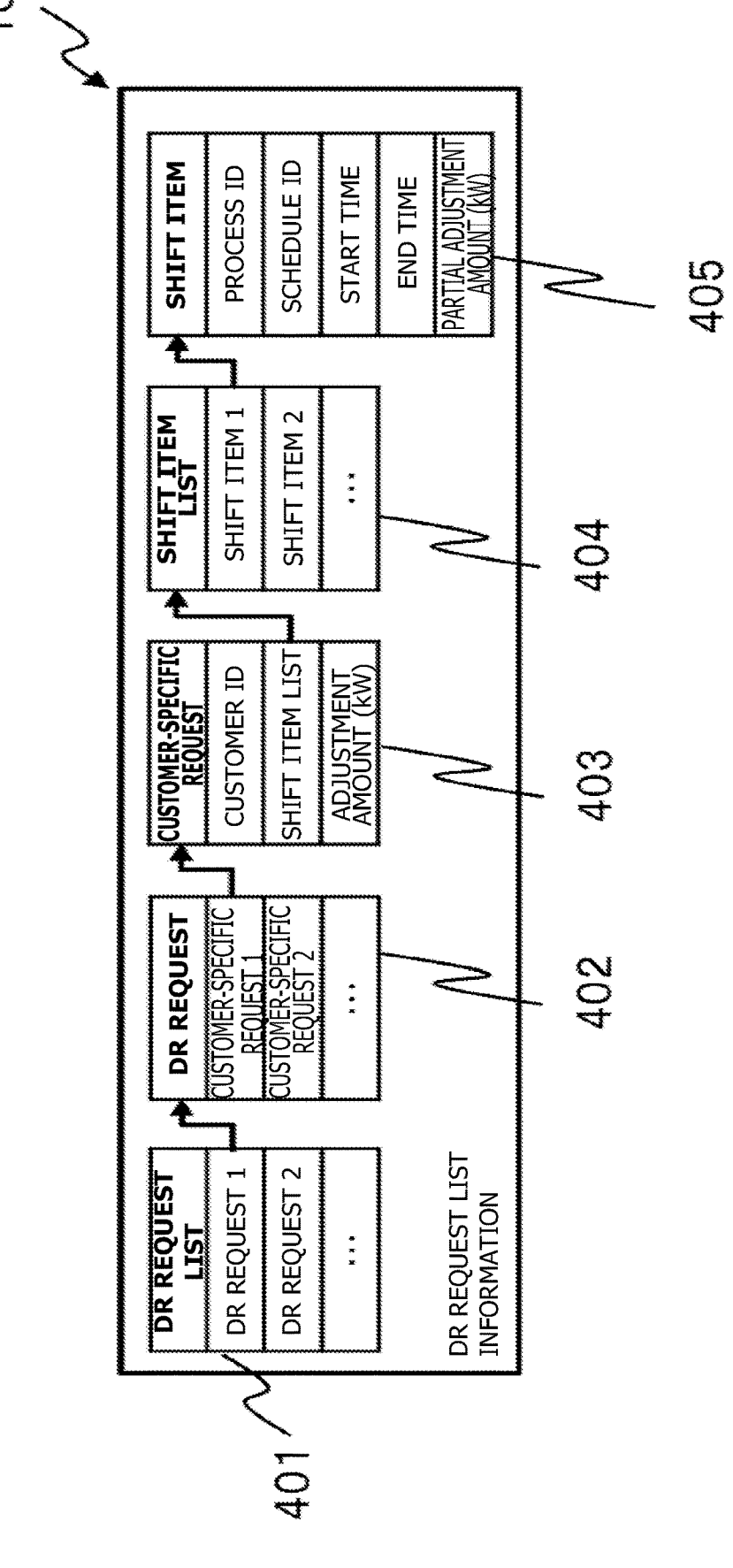
FIG. 4 is a schematic diagram listing exemplary DR request list information.

FIG. 4 is a schematic diagram listing exemplary DR request list information 102. As depicted in FIG. 4, the DR request list information 102 is stored with: a DR request list 401 indicating in list form the DR requests corresponding to the DR events; DR requests 402 indicating individual DR requests included in the DR request list 401 for individual customers; customer-specific requests 403 indicating specific request content regarding the individual customers included in the DR requests 402; a shift item list 404 indicating in list form those processes in the customer-specific requests 403 which can be shifted; and shift items 405 indicating specific content of each of the shift items included in the shift item list 404, the entries being stored in association with each other.

For example, a "customer-specific request 1" is defined as a "DR request 1" in the DR request list 401. What is requested as the "customer-specific request 1" is an electric power supply-demand adjustment request for the customer (e.g., factory A) of which the "customer ID" is "0001" and for which a "shift item 1" included in the "shift item list" is a shiftable process having "P001" as a "process ID" (e.g., assembling process of component A). The term "shift" signifies changing the time slot in which the process of interest was initially scheduled to another time slot, or shortening the time period in which the process of interest is performed. That is, the action "shift" involves staggering the initially scheduled process from a given time slot to another time slot with the same power usage, or shortening the time slot with the same power usage, thereby reducing the power demand amount. Thus, in a case where the above process "P001" is to be shifted, for example, what is requested is a "100 KW" power reduction as a partial adjustment amount constituting the power adjustment amount of the process of which the initially scheduled time slot (time slot with "start time" at "15:00:00" and "end time" at "16:00:00") is shortened to a time slot with "start time" at "15:00:00" and "end time" at "15:30:00" (for a 30-minute reduction). In this manner, the DR request list information 102 holds the information defining the request requesting each customer to adjust a specific amount of power in specific processes. The DR response list information 103 is explained next.

The DR response list information 103 indicates the responses obtained from the customers 200 reacting to the requests defined by the above DR request list information 102. The DR response list information 103 is input from the customer management terminal 200T at the customer 200 and retained by this system.

FIG. 5 is a schematic diagram listing exemplary DR response list information 103. As depicted in FIG. 5, the DR response list information 103 is stored with: a DR response list 501 indicating in list form the responses to the DR requests; DR responses 502 included in the DR response list 501 and each representing a DR response specific to an individual customer; customer-specific responses 503 representing specific content of each of the DR responses 502 from each of the customers; a shift item list 504 indicating in list form those processes which are included in the customer-specific responses 503 and which can be shifted; and shift items 505 indicating specific content of each of the shift items included in the shift item list 504, the entries being stored in association with each other. The above items have the content similar to that in which "demand" in the DR request list 401 in FIG. 4 is replaced with "response" and thus will not be discussed further. What is stored for each item is the information regarding the response from each of the customers reacting to the requests in the DR request list information 102. The customer priority information 104 is explained next.

The customer priority information 104 defines the priorities of the customers performing electric power supply-demand adjustment. The customer priority information 104 is input from the aggregator management terminal 100T in the aggregator system 100.

Figures 6, 7:
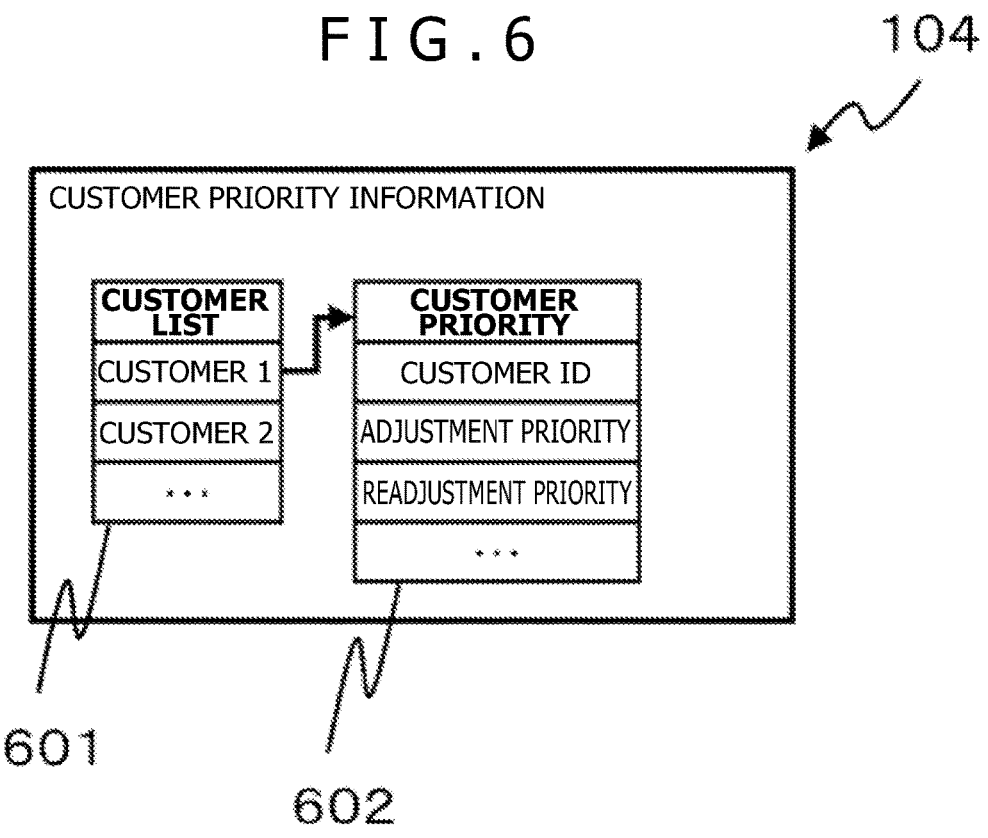
FIG. 6 is a schematic diagram listing exemplary customer priority information.
FIG. 7 is a schematic diagram listing exemplary customer evaluation policy information.

FIG. 6 is a schematic diagram listing exemplary customer priority information 104. As depicted in FIG. 6, the customer priority information 104 is stored with a customer list 601 and customer priorities 602 associated with each other. The customer list 601 indicates, in list form, customer IDs similar to those in the customer-specific requests 403 and to those in the customer-specific responses 503. The customer priorities 602 indicate the priorities of the individual customers included in the customer list 601.

For example, the customer referred to as "customer 1" in the customer priority information 104 with "0001" as "customer ID" is set as the customer with priority "1," i.e., the customer with the highest "adjustment priority" and the highest "readjustment priority." The customer evaluation policy information 105 is explained next.

The customer evaluation policy information 105 indicates the manner in which the customer priorities 602 found in the customer priority information 104 are defined. The customer evaluation policy information 105 is input from the aggregator management terminal 100T in the aggregator system 100 and retained by this system.

FIG. 7 is a schematic diagram listing exemplary customer evaluation policy information 105. As depicted in FIG. 7, the customer evaluation policy information 105 holds calculation formulas constituting conditions 701 for calculating the above-mentioned customer priorities.

For example, FIG. 7 indicates that the customer priority is defined by a calculation formula making up the calculation condition "(cumulative actual adjustment time/cumulative scheduled adjustment time)×time coefficient+(actual adjustment kW value/scheduled adjustment kW value)×power coefficient." The customer profile information 106 is explained next.

The customer profile information 106 indicates the features of the processes performed by the customers 200 consuming electric power. The customer profile information 106 is input from the customer management terminal 200T at each customer 200 and retained by this system.

FIG. 8 is a schematic diagram listing exemplary customer profile information 106. As depicted in FIG. 8, the customer profile information 106 is stored with: a customer list 801 similar to the above-mentioned customer list 601; a line list 802 indicating in list form the production lines as exemplary devices targeted for power consumption and set for the customers listed in the customer list 801; a process list 803 indicating in list form the processes performed by use of the listed lines 802; processes 804 included in the process list 803; schedules 805 according to which the listed processes are performed; a device list 806 listing the devices involved in the processes 804; time slot information 807 regarding each schedule included in the schedules 805; and devices 808 each representing an amount of power consumed by each device included in the device list 806.

For example, FIG. 8 indicates that "customer 1" (e.g., customer (such as factory A) having "0001" as "customer ID") included in the customer list 801 is associated with the line list stored for this customer, the line list including multiple lines "line 1," "line 2," etc. On the production line identified as "line 1," a "process 1" in the process list 803 is carried out multiple times. In the schedules, "first time" is defined to give the start scheduled time at "00:00:00 every day" and the end scheduled time at "00:30:00 every day." It is also indicated that the "process 1" can be shifted to start at "23:50:00 the day before" as the earliest start time, i.e., 10 minutes earlier than the start scheduled time, and to start at "00:10:00 on the day" as the latest start time, i.e., 10 minutes later than the start scheduled time.

Likewise, it is indicated that the "process 1" can be shifted to end at "00:20:00 on the day" as the earliest end time, i.e., 10 minutes earlier than the end scheduled time, and to end at "00:40:00 on the day" at the latest end time, i.e., 10 minutes later than the end scheduled time. The storage further stores that the power consumption of the "device 1," from among the devices used in the "process 1," is "50 KW." In this manner, the customer profile information 106 holds the profile of each customer in terms of the scheduled time slots for the customer's processes including a time slot indicative of an acceptable range for shifting (start scheduled time, end scheduled time, earliest start time, latest start time, earliest end time, latest end time) as well as the power consumption amount per process. Returning to FIG. 1, the components subsequent to the DR request adjustment I/F 107 are explained below.

The DR request adjustment I/F 107 is an I/F through which the information input from the aggregator management terminal 100T is received or through which the information processed by the aggregator system 100 is output to the aggregator management termina 100T.

The communication program 108 is a program that transmits the information processed by the aggregator system 100 to the DR contractor 300 and to the customers 200, and receives the information input from the DR contractor 300 or from the customers 200.

The DR request adjustment program 109 registers to the DR event list a new DR event included in a message received from the DR contractor 300 and, on the basis of the customer profile information 106, obtains the amount of power that can be reduced by each customer in a part or the entirety of the time slot targeted for the DR event. Also, the DR request adjustment program 109 aggregates the amounts of power that can be reduced by the customers, generates a DR request list fulfilling the amount of supply-demand adjustment requested by the DR event, transmits the generated DR request list to each of the customers, and registers on the DR response list a DR response received from each customer reacting to the DR request. Furthermore, in a case where the sum of addressable amounts of supply-demand adjustment included in the DR responses received from the customers fails to fulfill the total requested value of the DR event, the DR request adjustment program 109 generates another DR request list by adjusting the DR requests on the basis of the content of the customer priority information 104 and the content of the customer profile information 106, and transmits the DR request list thus generated to the customers.

On the basis of the content of the DR request list fulfilling the total requested value of the DR event, the DR request execution program 110 aggregates the amounts of supply-demand adjustment obtained by sending a DR request execution instruction to each of the customers, and outputs the aggregated amounts of supply-demand adjustment to the DR contractor 300 as the amount of power supply-demand adjustment. Following DR execution by the DR contractor 300, the DR request execution program 110 updates the customer priority information 104 in accordance with the level of request execution by each customer 200 and on the basis of the customer evaluation policy information 105. The customers 200 are explained next.

The customers 200 are the objects that consume electric power at the venue of business operators such as companies and organizations as well as individuals. For example, a customer is a factory A owned by a company B. Although not depicted in FIG. 1, the factory has various facilities that consume electric power. A computer at the factory, for example, receives diverse data from these facilities regarding, among others, the power consumed in each time slot.

As depicted in FIG. 1, the computer at the factory of the customer 200 has a communication program 201, a DR request editing and profile input program 202, and a DR request editing and profile input I/F 203.

The communication program 201 is a program that transmits the information processed by the above computer to the aggregator system 100 and to the DR contractor 300, or receives the information input from the aggregator system 100 or from the DR contractor 300.

The DR request editing and profile input program 202 receives the information processed by the aggregator system 100 and, upon receipt of the information input from the customer management terminal 200T, performs processes such as layout conversion on the received information for the aggregator system 100.

The DR request editing and profile input I/F 203 is an I/F that receives the information input from the customer management terminal 200T, or outputs the information processed by the aggregator system 100 or by the computer of the customer 200 to the aggregator management terminal 100T. The DR contractor 300 is explained next.

The DR contractor 300 is a business operator that supplies electric power to the customers 200. The DR contractor 300 makes requests to the aggregator for electric power supply-demand adjustment. For example, the computer owned by the business operator transmits a new DR event to the aggregator system 100. The process performed by this system is explained next.

FIG. 9 is a flowchart depicting the steps of the process (electric power supply-demand adjustment process) performed by this system.

As depicted in FIG. 9, in carrying out the electric power supply-demand adjustment process, the DR request adjustment program 109 first acquires a new DR event from the DR event list information 101 (FIG. 3), and sets the adjustment amount of the acquired DR event as the requested adjustment amount (S901). It is assumed that the DR event list information 101 is transmitted from the DR contractor 300 either periodically or in a suitably timed manner.

The DR request adjustment program 109 acquires from the customer profile information 106 the process that includes the time slot indicated in the DR event list information 101 obtained in step S901 (S902). For example, the DR request adjustment program 109 determines whether the time slot from "start date and time" to "end date and time" in the DR event list information 101 overlaps with the time slot from "start scheduled time" to "end scheduled time," with the time slot from "earliest start time" to "earliest end time" or to "latest end time," or with the time slot from "latest start time to "earliest end time" or to "latest end time" in the customer profile information 106. Upon determining that there exists an overlapping time slot between the DR event list information 101 and the customer profile information 106, the DR request adjustment program 109 acquires the process corresponding to the overlapping time slot.

The DR request adjustment program 109 shifts the process acquired in step S902 within an acceptable range indicated by the above time slot. The DR request adjustment program 109 thus acquires a combination of the shift and the process fulfilling the requested adjustment amount set in step S901 (S903). For example, the DR request adjustment program 109 shifts the time slot of "process 1" from the time slot ranging from "00:00:00 every day" as the start scheduled time to "00:30:00 every day" as the end schedule time to the time slot ranging from "23:50:00 the day before" as the earliest start time to "00:10:00 on the day" as the earliest end time so as to determine whether the power usage in "process 1" in the shifted time slot together with the power usage in this time slot including other processes fulfills the requested adjustment amount set above. If it is determined that the power usage in the shifted time slot fulfills the requested adjustment amount set above, the DR request adjustment program 109 goes to step S904.

On other hand, if it is determined that the power usage in the shifted time slot fails to fulfill the requested adjustment amount set above, the DR request adjustment program 109 repeatedly shifts the process to readjust the power usage to obtain a combination of the processes fulfilling the requested adjustment amount. That is, in step S903, the DR request adjustment program 109 obtains the combination of the processes that can be shifted within the acceptable range indicated by the above time slot, in which combination the power reduction amount fulfills the requested adjustment amount. The DR request adjustment program 109 adjusts the amount of shift of the above process within the shiftable range to determine the width of the time slot in which the process is shifted. By fine-adjusting the time slot of the process within the shiftable range in this manner, it is possible to perform electric power supply-demand adjustment with more accuracy. In carrying out the fine-adjustment, the DR request adjustment program 109 may determine that the requested adjustment amount set above is fulfilled if the sum of the shift amounts of the customers in the adjustable time slot (i.e., sum of the amounts of power supply-demand adjustment) falls within a predetermined error range of an adjustment power value constituting the requested adjustment amount. In this manner, the combination of the processes fulfilling the requested adjustment amount can be obtained flexibly.

The DR request adjustment program 109 sets the combination of the shifted processes in the DR request list information 102 (FIG. 4), and outputs specific DR request content to each customer (S904).

The DR request adjustment program 109 acquires the DR response list information 103 (FIG. 5) as a DR response from each customer reacting to the DR request output in step S904 (S905).

As depicted in FIG. 1, the aggregator or the customers possess power storage equipment E1 or E2 that stores electric power. Thus, the DR request adjustment program 109 reads the DR response list information 103 and, on the basis of the DR request list information 102, determines whether the customers 200 can shift the time slot of the requested process. If a given customer is determined to be unable to perform the shift, an instruction may be issued to let the process consume the power from the power storage equipment E2 of the customer having responded with the inability to do the shift. When the customer, given the instruction, performs the process by consuming the power stored in the power storage equipment E2, the requested adjustment amount designated in the DR event list information 101 can be maintained within the range of the time slot for the DR event constituting an adjustment time slot. Whereas what has been discussed above is the case where the power storage equipment E2 is used to maintain the requested adjustment amount, the request adjustment amount may alternatively be maintained using the power storage equipment E1 possessed by the aggregator system 100.

The DR request adjustment program 109 reads the DR response list information 103 received from the customers in step S905 and thereby determines whether the amount of supply-demand adjustment of the DR event received in step S901 is fulfilled (S906). If it is determined that the amount of supply-demand adjustment of the DR event received in step S901 is not fulfilled (No in S906), the DR request adjustment program 109 sets the shortfall in the amount of supply-demand adjustment as a new requested adjustment amount (S907). The DR request adjustment program 109 then returns to step S902 and repeats the subsequent steps. In this manner, steps S902 through S905 are repeated until the requested adjustment amount is fulfilled. That is, the DR request adjustment program 109 determines specific amounts by which the shiftable processes are shifted, in reference to the customer profile information 106 and DR response list information 103, to thereby calculate the time slot in which electric power supply-demand adjustment is performed within the requested range and the amount of the adjustment.

On the other hand, if determining that the amount of supply-demand adjustment of the DR event received in step S901 is fulfilled (Yes in S906), the DR request adjustment program 109 transmits a DR request execution instruction to the customers 200 (S908). The DR request execution program 110 updates the customer priority information 104 (FIG. 6) on the basis of the result of DR execution and the customer evaluation policy information 105 (FIG. 7) (S909).

For example, the DR request execution program 110 inserts, in the calculation formula of the customer evaluation policy information 105, the partial adjustment amount, start time, and end time in each shift item 505 included in the DR response list information 103 sent by a given customer 200 to the aggregator system 100, as well as the adjustment amount of the customer-specific response 503 as the sum of the partial adjustment amounts of the customer 200 of interest. The larger the resulting value from the calculation formula, the higher the priority to be assigned to the customer by the DR request execution program 110. In FIG. 7, the cumulative total of the actual past adjustment time (actual period from the start time to the end time) may be taken as the "cumulative actual adjustment time," and the adjustment time (scheduled time from the start time to the end time) included in the DR response list information 103 and transmitted to the aggregator system 100 as the "cumulative scheduled adjustment time." Likewise, the actual past adjustment time (actual value of the adjustment amount in the customer-specific response 503) may be taken as the "actual adjustment kW value," and the adjustment amount included in the DR response list information 103 and transmitted to the aggregator system 100 as the "scheduled adjustment kW value."

The DR request execution program 110 sorts the customers 200 in descending order of the customer priority values thus calculated, and writes the sorted priorities to "adjusted priorities" in the customer priority information 104. In a case where the priorities are readjusted in step S906 (No in S906), the DR request execution program 110 writes the customer priority values calculated above to "readjusted priorities" in the customer priority information 104. The time coefficient and power coefficient may be determined as needed depending on the environment to which this system is applied.

Figure 10:
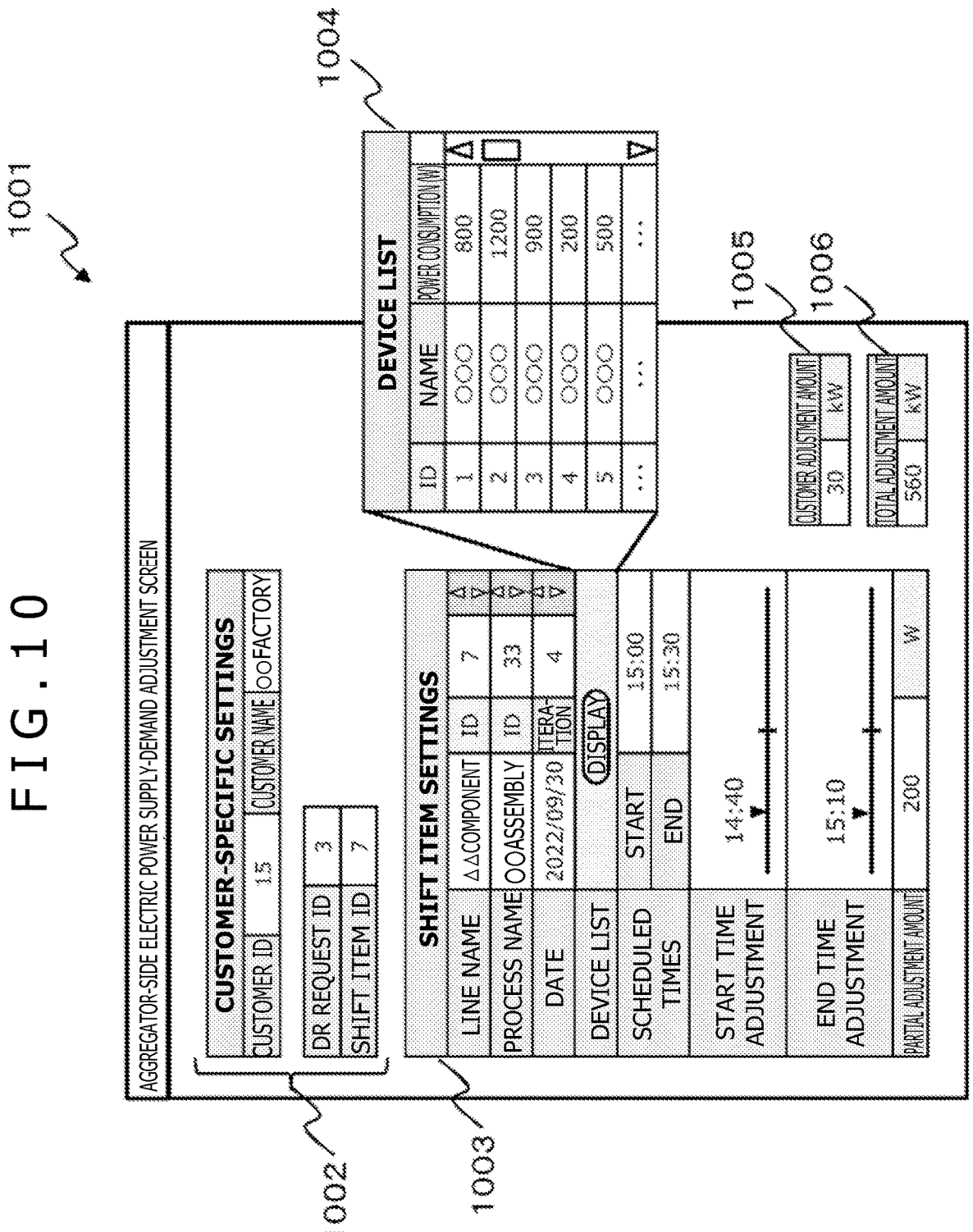
FIG. 10 is a schematic diagram depicting an exemplary electric power supply-demand adjustment screen (aggregator side) output by an aggregator system.

FIG. 10 is a schematic diagram depicting an exemplary electric power supply-demand adjustment screen (aggregator side) output by the aggregator system 100. The electric power supply-demand adjustment screen is displayed on a display device of the aggregator management terminal 100T. As depicted in FIG. 10, the aggregator-side electric power supply-demand adjustment screen 1001 indicates a customer ID, a customer name, a DR request ID, and a shift item ID as customer-specific settings 1002. These items constitute information stored in the customer profile information 106 and in the DR request list information 102. The items displayed as shift item settings 1003 make up information stored in the shift items 504 in the DR request list information 102.

On this screen, clicking on a "DISPLAY" button in a device list item causes a device list 1004 to appear as a list of the equipment and devices owned by this customer. The items indicated in the device list 1004 constitute information stored in the device list 806 and devices 800 included in the customer profile information 106.

A customer adjustment amount 1005 is information stored in the adjustment amounts included in the customer-specific requests 403 in the DR request list information 102. A total adjustment amount 1006 is the sum of the adjustment amounts of each customer regarding a single DR request stored as the customer adjustment amount 1005.

By checking the electric power supply-demand adjustment screen, the administrator of the aggregator system 100 can easily verify a specific DR request transmitted to each customer given a DR request received from the DR contractor 300. The electric power supply-demand adjustment screen is output to the aggregator management terminal 100T at the timing where step S904 of the electric power supply-demand adjustment process in FIG. 9 is carried out, for example.

The above-described electric power supply-demand adjustment screen is also displayed on the display device of the aggregator management terminal 100T upon receipt of the DR response list information 103 from a given customer. In this case, the customer ID, the customer name, the DR response ID, and the shift item ID are displayed as the customer-specific settings 1002. These items constitute information stored in the customer profile information 106 and in the DR response list information 103. The items displayed as the shift item settings 1003 make up information stored in the shift items 505 of the DR response list information 103. That is, each item holds information regarding the shift, which is made by the customer, of the time slot of the process within the acceptable range in response to the DR request.

On this screen, clicking on the "DISPLAY" button in the device list item causes the device list 1004 to appear as a list of the equipment and devices owned by this customer. The items indicated in the device list 1004 constitute information stored in the device list 806 and devices 800 included in the customer profile information 106.

The customer adjustment amount 1005 is information stored in the adjustment amounts included in the customer-specific requests 503 in the DR response list information 103. The total adjustment amount 1006 is the sum of the adjustment amounts of the customers stored as the customer adjustment amount 1005 with respect to a single DR request.

By checking the electric power supply-demand adjustment screen, the administrator of the aggregator system 100 can easily verify a specific response transmitted from each customer reacting to a DR request. The electric power supply-demand adjustment screen is output to the aggregator management terminal 100T at the timing where step S905 of the electric power supply-demand adjustment process in FIG. 9 is carried out, for example.

The DR request execution program 110 of the aggregator system 100 incentivizes each customer in accordance with the amount of power supply-demand adjustment offered by the customer upon determination that the amount of supply-demand adjustment of the DR event is fulfilled in step S906 of FIG. 9. In negawatt trading, for example, the larger the apparent power-generating capacity obtained by reducing power consumption, the larger the incentives to be given to the customer in question.

FIG. 11 is a schematic diagram depicting an exemplary electric power supply-demand adjustment screen (customer side) output by the computer of the customer 200. As depicted in FIG. 11, an electric power supply-demand adjustment screen 1101 on the customer side has a customer ID, a customer name, a DR request ID, and a shift item ID displayed as customer-specific settings 1102. These items constitute information stored in the customer profile information 106 and in the DR response list information 103. The items displayed as shift item settings 1103 make up information stored in the shift items 505 of the DR response list information 103. That is, the information displayed as the customer-specific settings 1102 and the shift item settings 1103 is similar to the information made up of the customer-specific settings 1002 and the shift item settings 1003 indicated in FIG. 10.

This screen, unlike in FIG. 10, displays shift items 1104 for designating replies to the shift items regarding the requested process. The shift items 1104 display an "OK" button indicating that the customer accepts the request, a "cancel" button indicating that the customer rejects the request, and an "edit" button indicating that the customer modifies the request by editing it. In this example, a DR request is issued to adjust the initial start time "15:00" and initial end time "15:30" respectively to "14:40" in a "start time adjustment" item and to "15:10" in an "end time adjustment" item. In response to this request, the customer with the customer ID "15" presses the "OK" button when accepting the request and presses the "cancel" button when rejecting the request. If this customer is unable to adjust to the "14:40" indicated in the start time adjustment item but can adjust to a time "14:50," the customer presses the "edit" button to slide, or otherwise move, an arrow A in the start time adjustment item from the time indication "14:40" to the time indication "14:50. In this manner, even when unable to accommodate the adjustment as requested, the customer can perform the adjustment within an acceptable range.

A customer adjustment amount 1105 is information stored in the adjustment amounts included in the customer-specific responses 503 in the DR response list information 103. Upon completion of the adjustment, the computer of the customer 200 accepts the pressing of a confirm and send button 1106, thereby transmitting the DR response list information 103 to the aggregator system 100.

By checking the electric power supply-demand adjustment screen, the administrator of the customer 200 can grasp what kind of adjustment is to be made to accommodate the DR request. Further, even if unable to accept the request, the administrator can still make settings to determine the degree to which the request can be accommodated and have the settings included in the DR response. In this manner, the customer can take part in the DR event within the acceptable range. The electric power supply-demand adjustment screen is output to the customer management terminal 200T at the timing where step S905 of the electric power supply-demand adjustment process in FIG. 9 is carried out.

By carrying out the above-described electric power supply-demand adjustment process, this system can efficiently find the customers that are capable of making adjustments to the requested amount of supply-demand adjustment. The system also makes it possible to perform electric power supply-demand adjustment more accurately than before.

Figure 12:
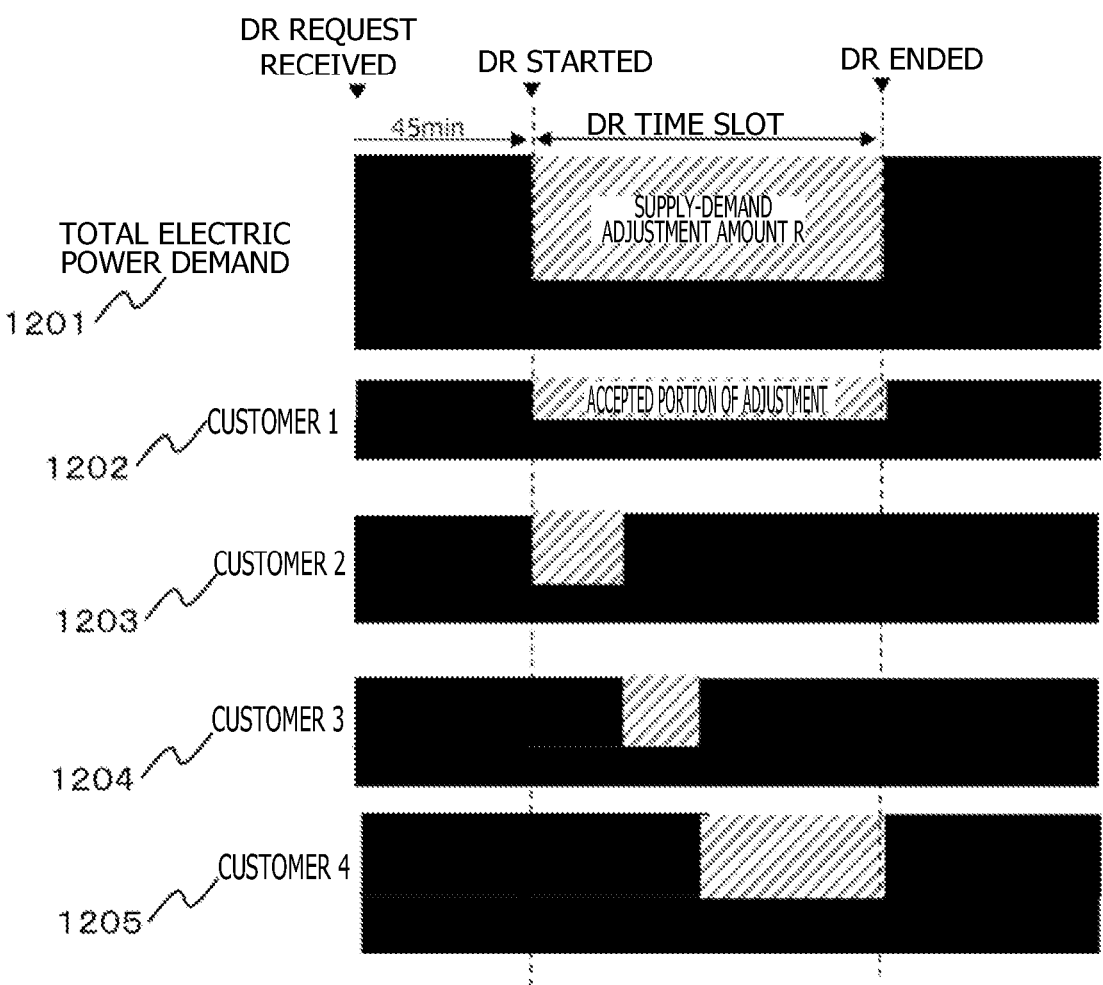
FIG. 12 is an illustration depicting the electric power supply-demand adjustment performed by different customers.

FIG. 12 is an illustration depicting the electric power supply-demand adjustment performed by different customers. As depicted in FIG. 12, consider a case in which, presenting total electric power demand 1201 and 45 minutes after receiving a DR request from the aggregator system 100, each customer is requested to perform supply-demand adjustment of a supply-demand adjustment amount R (shaded portion). The supply-demand adjustment is started 45 minutes after receipt of the DR request and ended upon elapse of a predetermined DR time slot.

Under such conditions, a customer 1, for example, is indicated as a customer capable of a supply-demand adjustment 1202 (shaded portion) throughout the time slot from the requested DR start time to the requested DR end time. It is thus indicated that the customer 1 can participate in DR as before. A customer 2 is indicated as a customer capable of a supply-demand adjustment 1203 (shaded portion) only in a part of the time slot from the requested DR start time to the requested DR end time. It is indicated that the customer 2 cannot continue the supply-demand adjustment up until the DR end time. A customer 3 is indicated as a customer failing to meet both the requested DR start time and the requested DR end time, and only capable of a supply-demand adjustment 1204 (shaded portion) halfway therebetween. It is thus indicated that the customer 3 cannot continue the supply-demand adjustment until the DR end time. Further, a customer 4 is indicated as a customer failing to meet the requested DR start time and only capable of a supply-demand adjustment 1205 (shaded portion) from halfway through the DR time slot until the DR end time.

In the case above, it used to be that only the customer 1 has been able to take part in DR. In contrast, where the above-described electric power supply-demand adjustment process is carried out by this system, the customers failing to meet the conditions indicated by the DR request such as the customers 2, 3, and 4 can still participate by giving DR response to have their processes shifted within the acceptable range, so that the aggregator system 100 can make adjustments to fulfill the DR request in reference to the shift items included in the DR response received from each customer. Consequently, more customers than before can take part in the aggregation. It is further possible to improve the current situation where, with numerous customers participating in the aggregation, those customers capable of addressing merely a part of the time slot cannot be aggregated as flexibility-ready resources.

As explained above, in the electric power supply-demand adjustment system of this embodiment, the power supply-demand adjustment system (aggregator system 100) performing electric power supply-demand adjustment by causing, by using a computer including a processor and a memory, a plurality of customers 200 to control power consumption in accordance with an instruction issued by an aggregator, as discussed above in connection with step S903 in FIG. 9, the processor, on the basis of demand response (DR) event information (DR event list information 101) that is stored in the memory and includes a scheduled event regarding the electric power supply-demand adjustment, and customer profile information 106 that is stored in the memory and indicates a feature of a time-shiftable process performed by the customers 200 consuming electric power, obtains a combination of processes that are shifted within an acceptable range, in which combination a power reduction amount fulfills a requested adjustment amount, to generate, for each of the customers, DR request information (DR request list information 102) including a request for supply-demand adjustment of a power adjustment amount determined by the scheduled DR event, and on the basis of DR response information (DR response list information 103) including a response to the time-shiftable process, the response being obtained from each of the customers given the generated DR request information, determines a width of the shift to carry out the electric power supply-demand adjustment.

As discussed above with reference to FIGS. 3, 9, and the like, the processor receives the DR event information from the DR contractor 300 and stores the received information into the memory. Based on the adjustment power value (adjustment amount) and adjustment time slot (obtained from the start date and time and the end date and time) included in the stored DE event information and on the customer profile information, the processor determines the shiftable width of the time slot in which each customer uses the devices. The processor then sets the sum of the electric power supply-demand adjustment amounts per customer in the adjusted time slot within a predetermined error range of the adjustment power value (e.g., such sum of the adjustment values that the difference from the requested adjustment amount falls within a predetermined range).

As explained above with reference to FIGS. 8, 9, and the like, the customer includes a factory having a production line including multiple processes in which the devices are used. The processor generates the DR request information by using the customer profiles with regard to the production lines and the shiftable multiple processes.

As described above with reference to FIGS. 4, 9, and the like, the processor transmits to each customer the DR request information including the determined shiftable width, and changes the time slot in which the devices are used, according to the request based on the DR request information received by each customer.

As depicted in FIG. 1, the aggregator or the customers each have the power storage equipment E1 or E2 in which electric power is stored. In a case where the customer is unable to change the time slot on the basis of the DR request information, the processor causes the electric power stored in the power storage equipment to be consumed, to thereby maintain the adjustment power value included in the DR event information within the range of the adjustment time slot.

Configured as described above, this system can perform electric power supply-demand adjustment accurately and efficiently, according to the operational status of the diverse equipment and processes belonging to the customers. That is, on the basis of the customer profiles including the information regarding the devices used by each customer, the electric power consumed by the devices, the time slots in which the devices are used, and the shiftable widths of the time slots, the aggregator determines the shift width of the time slot in which each customer uses the devices and performs electric power supply-demand adjustment accordingly. This makes it possible to accommodate, as flexibility aggregation-ready resources, the customers capable of addressing only partial time slots within the acceptable range of electric power supply-demand adjustment.

Recent years have witnessed a global acceleration of trends toward increasing the ratio of renewable energy. Given the trends, it has become necessary to develop and secure the customers capable of creating flexibility amid concerns for unstable supply of electric power. This system can fulfill the need for acquiring highly stable flexibility sources and contribute to attaining a carbon-neutral goal.

The present invention is not limited to the embodiment discussed above and may also be implemented by modifying some of its constituent elements or by suitably combining multiple constituent elements disclosed in conjunction with the above embodiment without departing from the spirit and scope of this invention.

Thus, the scope of the invention should be determined by the appended claims and their legal equivalents, rather than by the examples given.

What is claimed is:

1. An electric power supply-demand adjustment system comprising:
  a computer including a processor and a memory,
  wherein the system is configured to perform electric power supply-demand adjustment, in accordance with an instruction issued by an aggregator, for a plurality of customers that each perform one or more processes requiring electric power, the one or more processes including at least one time-shiftable process;
  wherein the memory is configured to store demand response (DR) event information including a DR adjustment power value and a DR adjustment time slot;
  wherein the memory is configured to store customer profile information indicating, for each of the one or more processes, an electric power demand and a duration of performance, and, for each of the at least one time-shiftable process, a shiftable performance time range within which the respective time-shiftable process is performable;

wherein the processor is configured to determine, for each time-shiftable process, a respective available power-demand reduction during the DR adjustment time slot, based on the respective electric power demand, the respective performance duration, and the respective shiftable performance time range;

wherein the processor is configured to determine obtains an initial combination of one or more time-shiftable processes that are shifted within their respective shiftable performance time ranges, such that an initial sum of the respective available power-demand reductions in the DR adjustment time slot achieved by shifting the time-shiftable process or processes in the initial combination is within a predetermined error range of the DR adjustment power value;

wherein the processor is configured to generate, based on the initial combination, DR request information for each of the plurality of customers, having at least one time-shiftable process in the initial combination, the DR request information including, for each such time-shiftable process, a proposed scheduling within the respective shiftable performance time range;

wherein the processor is configured to receive DR response information including at least one customer response to the DR request information, the at least one customer response including approval, denial, or amendment of the proposed scheduling;

wherein the processor is configured to determine, based on the DR response information, a subsequent combination of one or more time-shiftable processes that are shifted within their respective shiftable performance time ranges, such that a subsequent sum of the respective available power-demand reductions in the DR adjustment time slot achieved by shifting the time-shiftable process or processes in the subsequent combination is within the predetermined error range of the DR adjustment power value, to create an electric power supply-demand adjustment amount;

wherein, when the system performs the electric power supply-demand adjustment, the processor is configured to control a supply of the electric power to the plurality of customers based on the electric power supply-demand adjustment amount;

wherein the system is operatively coupled to power-storage equipment associated with either the aggregator or each of the plurality of customers;

wherein the processor is configured to determine a shortfall condition in which no combination of one or more time-shiftable processes shifted within their respective shiftable performance time ranges yields a sufficient sum of the respective available power-demand reductions in the DR adjustment time slot within the predetermined error range of the DR adjustment power value; and wherein the processor, upon determining the shortfall condition, is configured (i) to select from combinations considered in determining the shortfall condition a shortfall-minimizing combination that yields a shortfall-minimizing sum of the respective available power-demand reductions in the DR adjustment time slot that is closer to the DR adjustment power value than any other of the combinations considered in determining the shortfall condition, and (ii) to cause the power-storage equipment to supply the electric power in the DR adjustment time slot by a shortfall amount of electric power such that the shortfall amount added to the shortfall-minimizing sum is within the predetermined error range of the DR adjustment power value.

2. The electric power supply-demand adjustment system according to claim 1, wherein the processor is configured to receive the DR event information from a DR contractor and to store the received DR event information in the memory.

3. The electric power supply-demand adjustment system according to claim 2, wherein the plurality of customers includes at least one factory having a production line configured to perform the one or more processes requiring the electric power including the at least one time-shiftable process;

wherein the customer profile information stored in the memory identifies, for the one or more processes of the production line, the electric power demand and the duration of performance, and, for each time-shiftable process of the production line, the shiftable performance time range within which the time-shiftable process is performable; and wherein the processor is configured to generate the DR request information based on the customer profile information regarding the one or more processes performed by the production line.

4. The electric power supply-demand adjustment system according to claim 2, wherein the processor is configured to transmit the DR request information to the each of the plurality of customers having at least one time-shiftable process in the initial combination; and wherein the processor is configured to change an actual time slot of performance of the time-shiftable process in accordance with DR response information received from at least one of the plurality of customers having at least one time-shiftable process in the initial combination in response to the transmitted DR request information, when the DR response information indicates the approval or the amendment of the proposed scheduling for the respective time-shiftable process.

5. An electric power supply-demand adjustment method that uses a computer that includes a processor and a memory, the method comprising:

performing electric power supply-demand adjustment, in accordance with an instruction issued by an aggregator, for a plurality of customers that each perform one or more processes requiring electric power, the one or more processes including at least one time-shiftable process;

storing demand response (DR) event information in the memory by the processor, the DR event information including a DR adjustment power value and a DR adjustment time slot;

storing customer profile information in the memory by the processor, the customer profile information indicating, for each process, an electric power demand and a duration of performance, and, for each time-shiftable process, a respective shiftable performance time range within which the respective time-shiftable process is performable;

determining, by the processor and for each time-shiftable process, a respective available power-demand reduction during the DR adjustment time slot based on the respective electric power demand, the respective duration of performance, and the respective shiftable performance time range;

determining, by the processor, an initial combination of one or more time-shiftable processes that are shifted within their respective shiftable performance time ranges such that an initial sum of the respective available power-demand reductions in the DR adjustment time slot achieved by shifting the one or more time-shiftable processes in the initial combination is within a predetermined error range of the DR adjustment power value;

generating, by the processor and based on the initial combination, DR request information for each of the plurality of customers having at least one time-shiftable process in the initial combination, the DR request information including, for each such time-shiftable process, a proposed scheduling within the respective shiftable performance time range;

receiving, by the processor, DR response information from at least one of the plurality of customers having at least one time-shiftable process in the initial combination, the DR response information indicating an approval or an amendment of the proposed scheduling for the respective time-shiftable process;

determining, by the processor and based on the DR response information, a subsequent combination of one or more time-shiftable processes that are shifted within their respective shiftable performance time ranges such that a subsequent sum of the respective available power-demand reductions in the DR adjustment time slot achieved by shifting the one or more time-shiftable processes in the subsequent combination is within the predetermined error range of the DR adjustment power value, to create an electric power supply-demand adjustment amount;

when performing the electric power supply-demand adjustment, the processor controls a supply of the electric power to the plurality of customers based on the electric power supply-demand adjustment amount;

determining, by the processor, a shortfall condition in which no combination of one or more time-shiftable processes shifted within their respective shiftable performance time ranges yields a sufficient sum of the respective available power-demand reductions in the DR adjustment time slot within the predetermined error range of the DR adjustment power value;

selecting, by the processor, upon determining the shortfall condition, from combinations considered in determining the shortfall condition, a shortfall-minimizing combination that yields a shortfall-minimizing sum of the respective available power-demand reductions in the DR adjustment time slot that is closer to the DR adjustment power value than any other of the combinations considered in determining the shortfall condition; and causing, after selecting the shortfall-minimizing combination, power-storage equipment associated with either the aggregator or a customer to supply the electric power in the DR adjustment time slot by a shortfall amount of electric power such that the shortfall amount added to the shortfall-minimizing sum is within the predetermined error range of the DR adjustment power value.

6. The electric power supply-demand adjustment method according to claim 5, further comprising:

receiving, by the processor, the DR event information from a DR contractor; and storing, by the processor, the received DR event information into the memory.

7. The electric power supply-demand adjustment method according to claim 6, wherein the plurality of customers includes at least one factory having a production line configured to perform the one or more processes requiring the electric power including the at least one time-shiftable process;

wherein the customer profile information stored in the memory identifies, for the one or more processes of the production line, the electric power demand and the duration of performance, and, for each time-shiftable process of the production line, the respective shiftable performance time range within which the time-shiftable process is performable; and the method further comprising:

generating, by the processor, DR request information based on the customer profile information regarding the one or more processes performed by the production line.

8. The electric power supply-demand adjustment method according to claim 6, further comprising:

transmitting, by the processor, the DR request information to each of the plurality of customers having at least one time-shiftable process in the initial combination; and changing, by the processor, an actual time slot of performance of the time-shiftable process in accordance with DR response information received from the at least one of the plurality of customers having at least one time-shiftable process in the initial combination in response to the transmitted DR request information indicating the approval or the amendment of the proposed scheduling for the respective time-shiftable process.

*    *    *    *    *